(12) United States Patent
Kim et al.

(10) Patent No.: US 12,506,964 B2
(45) Date of Patent: Dec. 23, 2025

(54) CAMERA ACTUATOR

(71) Applicant: JAHWA ELECTRONICS CO., LTD., Cheongju-si (KR)

(72) Inventors: Dok Hyun Kim, Cheongju-si (KR); Kyoung Yong Lee, Cheongju-si (KR); Byung Cheol Lee, Jinju-si (KR)

(73) Assignee: JAHWA ELECTRONICS CO., LTD., Cheongju-si (KR)

( * ) Notice: Subject to any disclaimer, the term of this patent is extended or adjusted under 35 U.S.C. 154(b) by 237 days.

(21) Appl. No.: 18/039,747

(22) PCT Filed: Apr. 20, 2022

(86) PCT No.: PCT/KR2022/005648
§ 371 (c)(1),
(2) Date: Jun. 1, 2023

(87) PCT Pub. No.: WO2022/225325
PCT Pub. Date: Oct. 27, 2022

(65) Prior Publication Data
US 2024/0040254 A1 Feb. 1, 2024

(30) Foreign Application Priority Data
Apr. 21, 2021 (KR) .................. 10-2021-0051729

(51) Int. Cl.
*H04N 23/68* (2023.01)
(52) U.S. Cl.
CPC ................ *H04N 23/687* (2023.01)

(58) Field of Classification Search
CPC ........ H04N 23/54; H04N 23/55; H04N 23/57; H04N 23/687; H04N 23/51; H04N 23/685;
(Continued)

(56) References Cited

U.S. PATENT DOCUMENTS

2006/0269262 A1* 11/2006 Shin .................. G03B 5/02
348/E5.046
2006/0269263 A1* 11/2006 Kim .................. H04N 23/68
348/E5.046
(Continued)

FOREIGN PATENT DOCUMENTS

JP 6842046 B2 3/2021
KR 20150022641 A 3/2015
(Continued)

*Primary Examiner* — Abdelaaziz Tissire
(74) *Attorney, Agent, or Firm* — Bayramoglu Law Offices LLC

(57) ABSTRACT

A camera actuator includes: a first OIS carrier provided with first and second magnets and an image sensor, and moving in a first direction perpendicular to an optical axis direction; a first drive coil for moving the first OIS carrier in the first direction by generating an electromagnetic force on the first magnet; a second OIS carrier provided on the upper portion of the first OIS and moving in the optical axis direction and a second direction perpendicular to the first direction; a second drive coil for moving the second OIS carrier in the second direction by generating an electromagnetic force on the second magnet; and a support frame provided with the first and second drive coils and providing a moving space for the first and second OIS carriers.

10 Claims, 10 Drawing Sheets

(58) Field of Classification Search
CPC ......... H05K 1/189; H05K 2201/10121; H05K 1/0277; G02B 27/646; G02B 7/04–105; H04M 1/0264; G03B 2205/0053–0084; G03B 7/10; G03B 13/36
See application file for complete search history.

(56) References Cited

U.S. PATENT DOCUMENTS

| | | | |
|---|---|---|---|
| 2007/0025710 A1* | 2/2007 | Shin | H04N 23/68 348/E5.046 |
| 2009/0128637 A1* | 5/2009 | Noji | H04N 23/687 348/208.1 |
| 2015/0049209 A1* | 2/2015 | Hwang | G02B 7/09 348/208.11 |
| 2015/0055220 A1* | 2/2015 | Lim | G02B 27/646 359/557 |
| 2015/0373272 A1* | 12/2015 | Lim | H04N 23/687 348/208.11 |
| 2019/0377155 A1* | 12/2019 | Bachar | G02B 7/09 |
| 2020/0333686 A1* | 10/2020 | Kim | G03B 30/00 |
| 2021/0048730 A1* | 2/2021 | Jeong | G02B 27/646 |
| 2021/0258491 A1* | 8/2021 | Park | H04N 23/57 |
| 2021/0289111 A1* | 9/2021 | Lim | H04N 23/55 |
| 2022/0187616 A1* | 6/2022 | Lee | H01F 7/081 |
| 2022/0252826 A1* | 8/2022 | Seo | G03B 30/00 |

FOREIGN PATENT DOCUMENTS

| | | |
|---|---|---|
| KR | 20170141523 A | 12/2017 |
| KR | 20180076165 A | 7/2018 |
| KR | 102146385 B1 | 8/2020 |
| KR | 20210010033 A | 1/2021 |

\* cited by examiner

CAMERA ACTUATOR

CROSS REFERENCE TO THE RELATED APPLICATIONS

This application is the national phase entry of International Application No. PCT/KR2022/005648, filed on Apr. 20, 2022, which is based upon and claims priority to Chinese Patent Application No. 10-2021-0051729, filed on Apr. 21, 2021, the entire contents of which are incorporated herein by reference.

TECHNICAL FIELD

The present invention relates to a camera actuator, and more particularly, to an actuator capable of implementing autofocus and optical image stabilization functions.

BACKGROUND

As a hardware technology for image processing advances and a user need for image capturing and the like increases, functions such as autofocus (AF) and optical image stabilization (OIS) are implemented in stand-alone camera devices as well as camera modules mounted in mobile terminals such as mobile phones and smartphones.

The autofocus function refers to a function of adjusting a focal length with respect to a subject by linearly moving a carrier, which is equipped with a lens and the like, in an optical axis direction, thereby creating a clear image on an image sensor (CMOS, CCD, etc.) provided at a rear end of the lens.

In addition, the optical image stabilization function refers to a function of improving clarity of an image by adaptively moving a carrier, which is equipped with a lens, to compensate for swaying of the lens when the lens sways because of a hand shake problem.

One of the representative methods of implementing the AF or OIS function is a method of installing a magnet (coil) on a movable body (carrier), installing a coil (magnet) on a stationary body (housing, another type of carrier, or the like), and then generating an electromagnetic force between the coil and the magnet, thereby moving the movable body in the optical axis direction or a direction perpendicular to the optical axis.

Meanwhile, there is a device that connects a wire to the carrier to implement a function of physically supporting the carrier and a function of restoring a position of the carrier. However, the wire of the device is easily deformed in physical properties by internal and external environments, which degrades driving precision. In particular, in case that a weight and size of the lens are increased by high specifications of the lens, the driving performance may be further degraded.

Recently, to solve the problem with the wire-type device, a configuration has been applied in which a ball is interposed between the movable body and the stationary body to consistently maintain an appropriate spacing distance between the movable body and the stationary body, and a frictional force is minimized by a rotational motion of the ball and a point contact with the ball, such that the carrier moves more smoothly and accurately.

In the case of the device or actuator with the integrated AF and OIS function, the AF needs to be moved in the optical axis direction, and the OIS needs to be moved in the direction perpendicular to the optical axis. Therefore, the device or actuator is implemented to have a complex physical structure in which AF and OIS carriers are stacked on each other.

The actuator in the related art performs the optical image stabilization by moving a lens assembly in the direction perpendicular to the optical axis direction. However, because the lens assembly accounts for most of the weight of the camera module, there is a problem in that movement accuracy of the lens assembly and performance reliability of the camera module deteriorate.

In addition, in the actuator in the related art, the magnet and the drive coil for moving the AF and OIS carriers are disposed in lying postures, which significantly increases a height of the actuator in the optical axis direction.

That is, because the camera actuator is installed uprightly on a main substrate of a portable terminal such as a smartphone, the increase in height of the actuator directly increases a thickness of the portable terminal. For this reason, there are problems in that the actuator in the related art cannot conform to the trend toward the slimmer portable terminal and has extremely low spatial utilization.

In addition, in the case of the actuator in the related art, the heights, sizes, or the like of structures and components directly related to driving performance need to be reduced to conform to thickness specifications and the like of the portable terminal, which eventually causes a problem in that driving performance of the device in the related art deteriorates.

SUMMARY

Technical Problem

The present invention has been made in an effort to solve the above-mentioned problems discussed in the section of Background Art, and an object of the present invention is to provide a camera actuator capable of comparatively easily implementing OIS and improving reliability of a camera module.

Another object of the present invention is to provide a camera actuator capable of significantly reducing a thickness (based on an optical axis direction) of an actuator.

Still another object of the present invention is to provide a camera actuator capable of minimizing a degree to which a magnetic field of an OIS drive part affects an AF drive part.

Yet another object of the present invention is to provide a camera actuator capable of not only preventing OIS balls from being separated to the outside, but also preventing interference with a base when an OIS carrier moves.

The other objects and advantages of the present invention may be understood from the following descriptions and more clearly understood from the embodiment of the present invention. In addition, the objects and advantages of the present invention may be realized by components and a combination of the components disclosed in claims.

Technical Solution

To achieve the above-mentioned objects, the present invention provides a camera actuator including: a first OIS carrier having first and second magnets and an image sensor and configured to move in a first direction perpendicular to an optical axis direction; a first drive coil configured to generate an electromagnetic force on the first magnet to move the first OIS carrier in the first direction; a second OIS carrier provided on an upper portion of the first OIS carrier and configured to move in a second direction perpendicular to the optical axis direction and the first direction; a second drive coil configured to generate an electromagnetic force on the second magnet to move the second OIS carrier in the second direction; and a support frame having the first and second drive coils and configured to provide a movement space for the first and second OIS carriers.

In addition, the camera actuator of the present invention may further include: a first guide rail provided on the upper portion of the first OIS carrier and disposed in the first direction; a second guide rail provided on a lower portion of the second OIS carrier and disposed to face the first guide rail; and a first OIS ball provided between the first and second guide rails.

In addition, the camera actuator of the present invention may further include: a third guide rail provided on an upper portion of the second OIS carrier and disposed in the second direction; a fourth guide rail provided on a lower portion of the support frame and disposed to face the third guide rail; and a second OIS ball provided between the third and fourth guide rails.

In addition, the support frame may have attraction yokes disposed to respectively face the first and second magnets and configured to pull the first OIS carrier toward the support frame.

In addition, the camera actuator of the present invention may further include: an AF carrier having a third magnet and a lens assembly and configured to move in the optical axis direction; and a third drive coil provided on the support frame and configured to generate an electromagnetic force on the third magnet to move the AF carrier in the optical axis direction.

In addition, the camera actuator of the present invention may further include: a fifth guide rail provided on an outer portion of the AF carrier and disposed in the optical axis direction; a sixth guide rail provided on an inner portion of the support frame and disposed to face the fifth guide rail; and an AF ball provided between the fifth and sixth guide rails.

In addition, the support frame may have a receptacle configured to accommodate the first and second magnets.

In addition, the attraction yoke may be provided on an upper portion of the receptacle.

In addition, the camera actuator of the present invention may further include: a first Hall sensor disposed inside the first drive coil; a second Hall sensor disposed inside the second drive coil; and a third Hall sensor disposed outside the third drive coil and disposed at a position most spaced apart from the first and second magnets.

In addition, the first magnet may be disposed to be closer to the second magnet based on a center thereof.

Advantageous Effects

According to the present invention, the actuator corrects the hand shake problem by moving the image sensor, which is relatively light in weight, instead of moving the lens assembly, which accounts for most of the weight of the camera module. Therefore, it is possible to comparatively easily implement the OIS and improve reliability of the camera module.

In addition, according to the present invention, the magnets and drive coils, which constitute the AF and OIS drive parts, are disposed uprightly in the optical axis direction, which may significantly reduce the thickness (based on the optical axis direction) of the actuator.

In addition, according to the present invention, it is possible to minimize a degree to which the magnetic field of the OIS drive part affects the AF drive part.

In addition, according to the present invention, it is possible to not only prevent the OIS balls from being separated to the outside, but also prevent interference with the base when the OIS carrier moves.

DETAILED DESCRIPTION OF THE EMBODIMENTS

Figure 1:
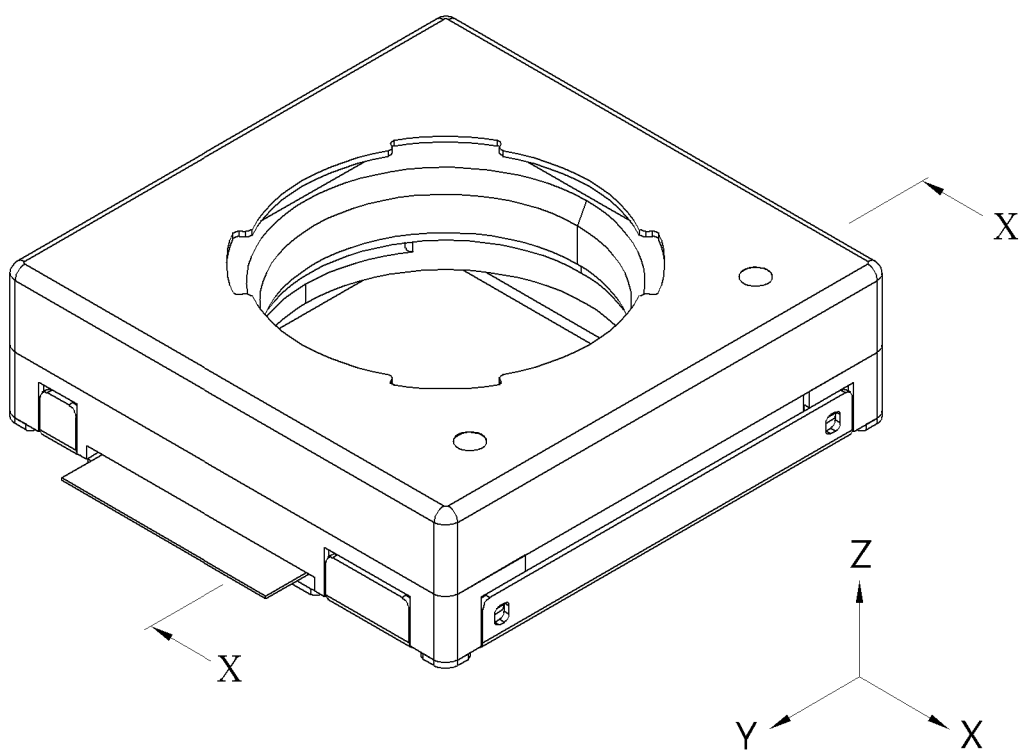
FIG. 1 is a perspective view of a camera actuator according to an embodiment of the present invention.

Hereinafter, exemplary embodiments of the present invention will be described in detail with reference to the accompanying drawings. In addition, terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Therefore, the exemplary embodiments disclosed in the present specification and the configurations illustrated in the drawings are just the best preferred exemplary embodiments of the present invention and do not represent all the technical spirit of the present invention. Accordingly, it should be appreciated that various equivalents and modified examples capable of substituting the exemplary embodiments may be made at the time of filing the present application.

Figure 2:
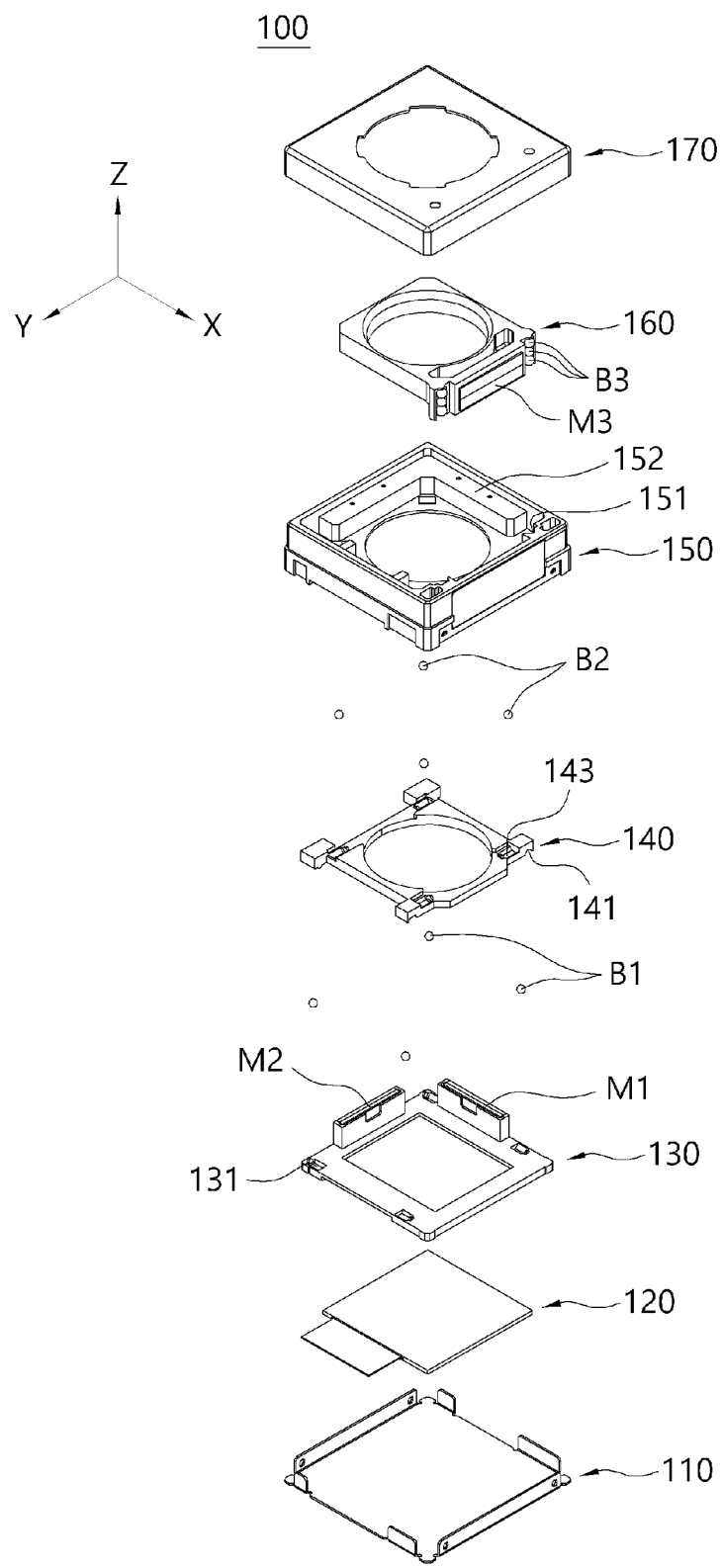
FIGS. 2 and 3 are exploded coupled views illustrating a configuration of an actuator according to the embodiment of the present invention.
Figure 3:
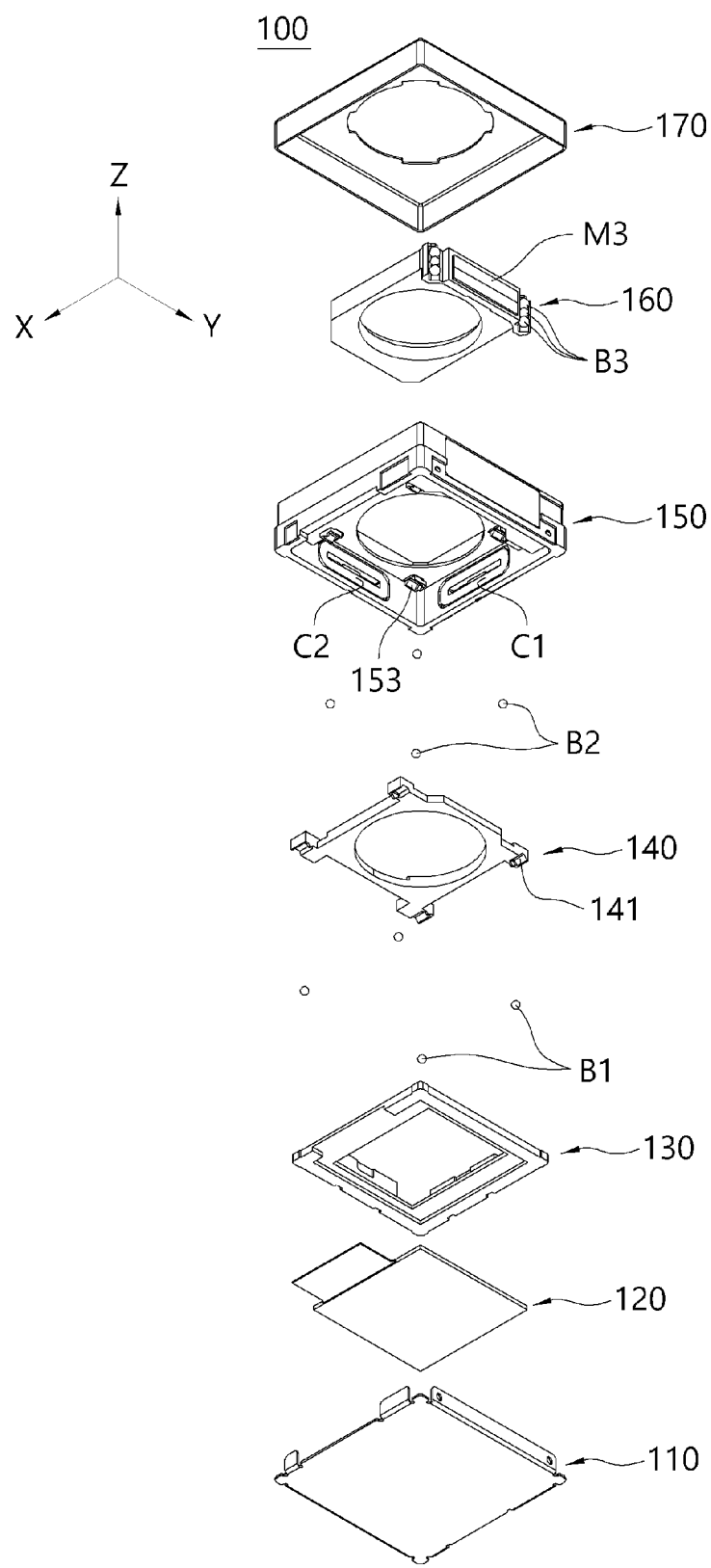

FIG. 1 is a perspective view of a camera actuator (hereinafter, referred to as an 'actuator') according to an embodiment of the present invention, and FIGS. 2 and 3 are exploded coupled views illustrating a configuration of the actuator according to the embodiment of the present invention.

Hereinafter, an overall configuration of the present invention will be described first with reference to FIGS. 1 to 3, and then detailed descriptions of embodiments of the present invention for implementing AF and OIS functions will be described below.

An actuator 100 according to an embodiment of the present invention is an embodiment in which both autofocus (AF) and optical image stabilization (OIS) are implemented together. However, the actuator 100 of the present invention may, of course, be implemented as an actuator operated only for the OIS.

As illustrated in FIGS. 1 to 3, the actuator 100 according to the embodiment of the present invention may include a base 110, a first OIS carrier 130, a second OIS carrier 140, a support frame 150, an AF carrier 160, and a casing 170.

The first OIS carrier 130 has first and second magnets M1 and M2 and an image sensor 120, and the support frame 150 has first to third drive coils C1, C2, and C3. Further, the AF carrier 160 has a third magnet M3 and a lens assembly (not illustrated).

In this case, the AF carrier 160 may have an opening portion formed at a center thereof so that the lens assembly is mounted in the opening portion. The second OIS carrier 140 and the support frame 150 respectively have opening portions formed at centers thereof so that the lens assembly may move in an upward/downward direction at the time of implementing the AF.

In addition, the image sensor 120 is mounted on a lower portion of the first OIS carrier 130. Further, the first OIS carrier 130 has an opening portion formed at a center thereof so that the image sensor 120 is exposed in an optical axis direction. Therefore, the image sensor 120 may detect light introduced from the lens assembly. In this case, the image sensor 120 may include an image capturing element such as a charged-coupled device (CCD) and a complementary metal-oxide semiconductor (CMOS).

A Z-axis direction illustrated in FIGS. 1 to 3 is the optical axis direction that is a direction in which light is introduced into the lens assembly. The Z-axis direction corresponds to a direction in which the AF carrier 160 to be described below moves forward or rearward.

When the AF carrier 160 moves forward or rearward in the optical axis direction, a focal length between the lens assembly and the image sensor 120 provided at a rear end of the actuator 100, such that the AF function is implemented. The detailed description thereof will be described below.

Meanwhile, an X-axis direction and a Y-axis direction, which are directions perpendicular to the optical axis direction (Z-axis direction), mean directions in which the image sensor 120 is moved by OIS driving to compensate for swaying caused by a hand shake problem. In the following description, the X-axis direction is referred to as a first direction, and the Y-axis direction is referred to as a second direction. However, the X-axis and Y-axis directions are only one example from a relative standpoint. Of course, any one of the X-axis direction and the Y-axis direction may be the first direction, and the other of the X-axis direction and the Y-axis direction may be the second direction.

As illustrated in FIGS. 2 and 3, the actuator 100 according to the embodiment of the present invention has a structure in which the first OIS carrier 130, the second OIS carrier 140, the support frame 150, the AF carrier 160, and the casing 170 are sequentially provided based on the base 110.

Figure 4:
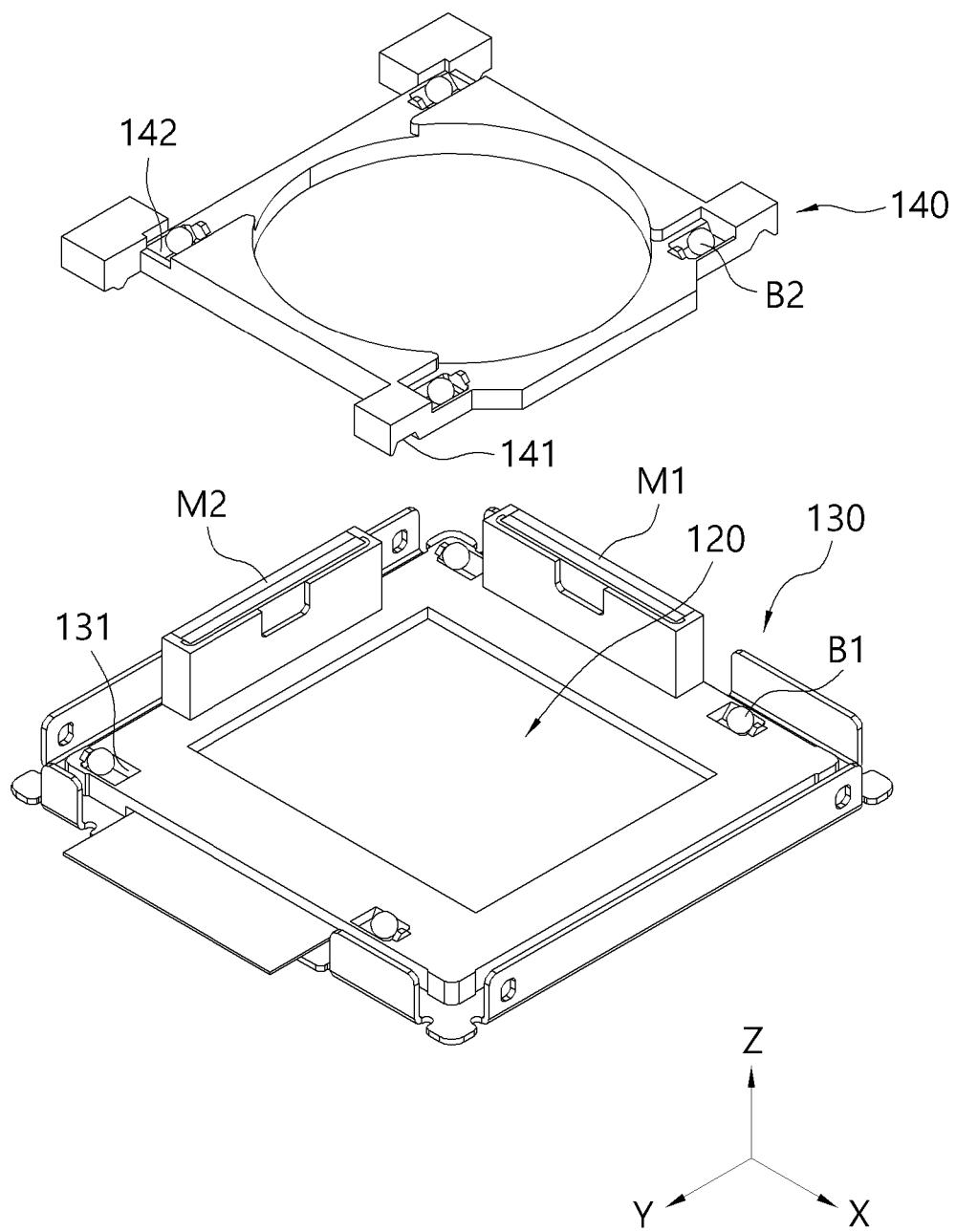
FIG. 4 is an exploded coupled view of first and second OIS carriers according to the embodiment of the present invention.
Figure 5:
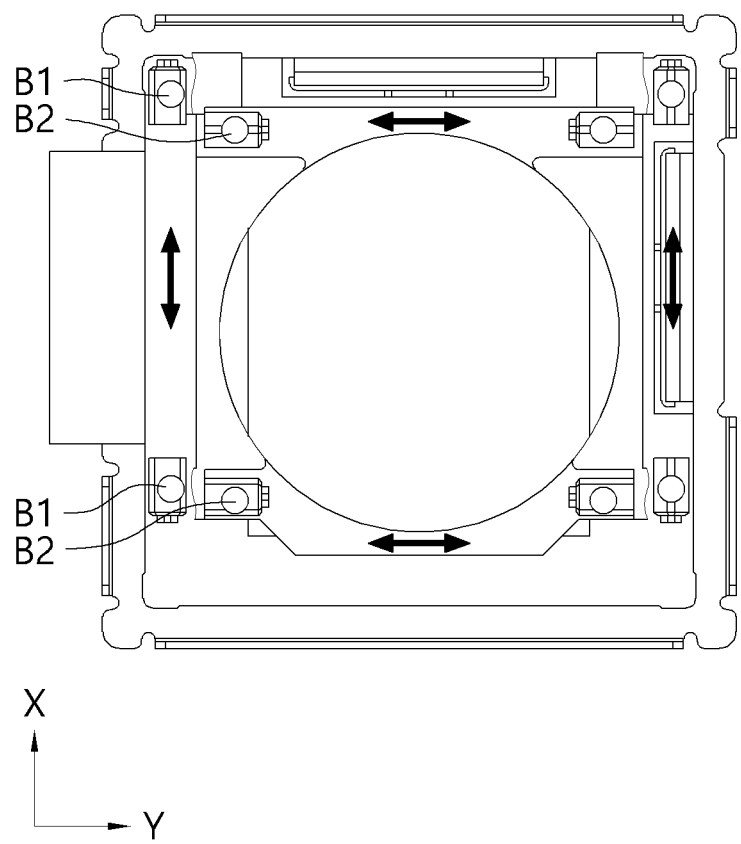
FIG. 5 is a view for explaining an OIS function of the first and second OIS carriers according to the embodiment of the present invention.
Figure 6:
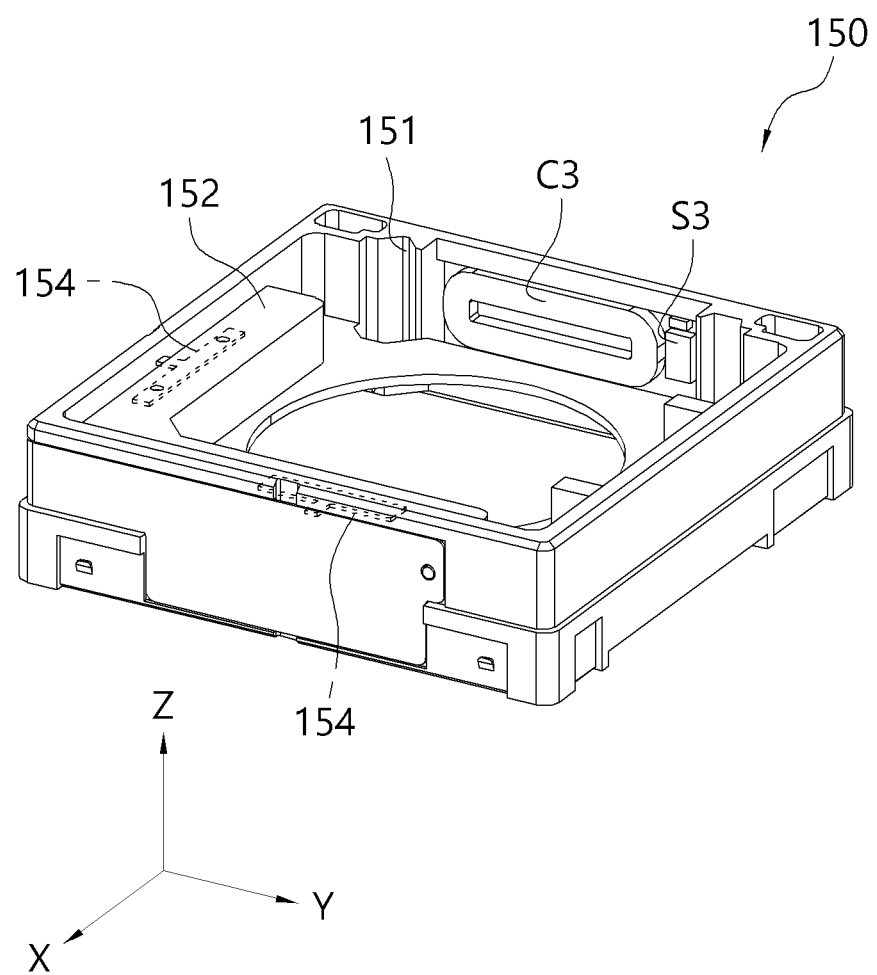
FIGS. 6 and 7 are perspective views of a support frame according to the embodiment of the present invention.
Figure 7:
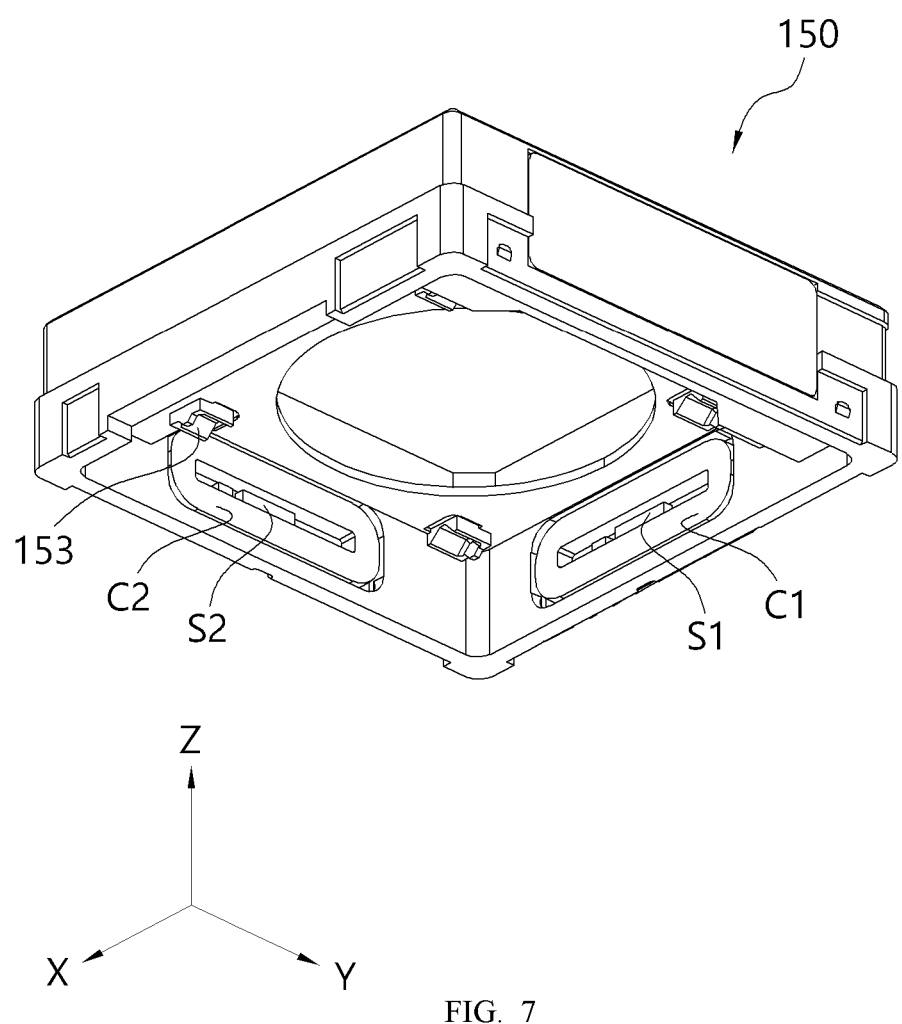

FIG. 4 is an exploded coupled view of the first and second OIS carriers according to the embodiment of the present invention, and FIG. 5 is a view for explaining the OIS function of the first and second OIS carriers according to the embodiment of the present invention. Further, FIGS. 6 and 7 are a perspective view of the support frame according to the embodiment of the present invention.

Hereinafter, the implementation of the OIS of the actuator according to the embodiment of the present invention will be described with reference to FIGS. 4 to 7.

The actuator 100 according to the embodiment of the present invention includes first guide rails 131 provided on an upper portion of the first OIS carrier 130 and disposed in the first direction (X-axis direction), second guide rails 141 provided on a lower portion of the second OIS carrier 140 and disposed to face the first guide rails 131, and first OIS balls B1 provided between the first and second guide rails 131 and 141.

The first OIS balls B1 may roll between the first and second guide rails 131 and 141 and move the first OIS carrier 130 in the first direction.

The first guide rails 131 may be respectively formed at corners of the first OIS carrier 130, and the second guide rails 141 may also be respectively formed at corners of the second OIS carrier 140. However, the present invention is not limited thereto.

The first magnet M1 is installed uprightly on the upper portion of the first OIS carrier 130 and disposed in the first direction between the two first OIS balls B1.

The first drive coil C1 may be disposed on an inner surface of the support frame 150 and face the first magnet M1, and a first Hall sensor S1 may be disposed inside the first drive coil C1.

When the OIS function is implemented in the first direction (X-axis direction), the first OIS carrier 130 moves in the first direction in an internal space of the support frame 150 relative to the second OIS carrier 140. Therefore, the first OIS carrier 130 corresponds to a movable body, and the second OIS carrier 140 corresponds to a stationary body from a corresponding standpoint.

The first Hall sensor S1 transmits an electrical signal, which corresponds to a direction and size of a motion made by a hand shake problem, to an operation driver (not illustrated). The operation driver performs control to apply electric power, which has a magnitude and direction corresponding to the electrical signal, to the first drive coil C1.

When the electric power is applied to the first drive coil C1, the first drive coil C1 generates an electromagnetic force on the first magnet M1 installed on the first OIS carrier 130, and the first OIS carrier 130 is moved in the first direction by the electromagnetic force.

In this case, because the image sensor 120 is coupled to the first OIS carrier 130, the image sensor 120 also moves in the first direction when the first OIS carrier 130 moves in the first direction. Therefore, the hand shake problem is corrected by components in the first direction.

The first OIS carrier 130 may be moved by feedback control between the first Hall sensor S1 and the operation driver.

The actuator 100 according to the embodiment of the present invention includes third guide rails 142 provided on an upper portion of the second OIS carrier 140 and disposed in the second direction (Y-axis direction), fourth guide rails 153 provided on a lower portion of the support frame 150 and disposed to face the third guide rails 142, and second OIS balls B2 provided between the third and fourth guide rails 142 and 153.

The second OIS balls B2 may roll between the third and fourth guide rails 142 and 153 and move the second OIS carrier 140 in the second direction.

The third guide rail 142 may be respectively formed at corners of the second OIS carrier 140, and the fourth guide rail 153 may also be respectively formed at corners of the support frame 150. However, the present invention is not limited thereto.

In addition, the third and fourth guide rails 142 and 153 may be disposed so as not to overlap the first and second guide rails 131 and 141.

The second magnet M2 is installed uprightly on the upper portion of the first OIS carrier 130 and disposed in the second direction between the two second OIS balls B2.

The second drive coil C2 may be disposed on the inner surface of the support frame 150 and face the second magnet M2, and a second Hall sensor S2 may be disposed inside the second drive coil C2.

When the OIS function is implemented in the second direction (Y-axis direction), the second OIS carrier 140 moves in the second direction in the internal space of the support frame 150 relative to the support frame 150. Therefore, the second OIS carrier 140 corresponds to a movable body, and the support frame 150 corresponds to a stationary body from a corresponding standpoint.

The second Hall sensor S2 transmits an electrical signal, which corresponds to a direction and size of a motion made by a hand shake problem, to the operation driver (not illustrated). The operation driver performs control to apply electric power, which has a magnitude and direction corresponding to the electrical signal, to the second drive coil C2.

When the electric power is applied to the second drive coil C2, the second drive coil C2 generates an electromagnetic force on the second magnet M2 installed on the first OIS carrier 130, and the second OIS carrier 140 is moved in the second direction by the electromagnetic force.

In this case, the image sensor 120 is coupled to the first OIS carrier 130, and the first OIS carrier 130 is coupled to the second OIS carrier 140, such that the first OIS carrier 130 and the image sensor 120 also move in the second direction when the second OIS carrier 140 moves in the second direction. Therefore, the hand shake problem is corrected by components in the second direction.

The second OIS carrier 140 may be moved by feedback control between the second Hall sensor S2 and the operation driver.

As described above, the actuator 100 according to the embodiment of the present invention corrects the hand shake problem by moving the image sensor 120, which is relatively light in weight, instead of moving the lens assembly, which accounts for most of the weight of the camera module. Therefore, it is possible to comparatively easily implement the OIS and improve reliability of the camera module.

With reference back to FIG. 6, the support frame 150 may have a receptacle 152 configured to accommodate the first and second magnets M1 and M2. In this case, the receptacle 152 may be formed in an approximately "¬" shape. Of course, the first and second coils C1 and C2, which respectively face the first and second magnets M1 and M2, are provided in the receptacle.

As described above, because the first and second magnets M1 and M2 are disposed and accommodated in the receptacle 152, it is possible to prevent a third Hall sensor S3 from being affected by the magnetic field fields formed by the first and second magnets M1 and M2.

Figure 8:
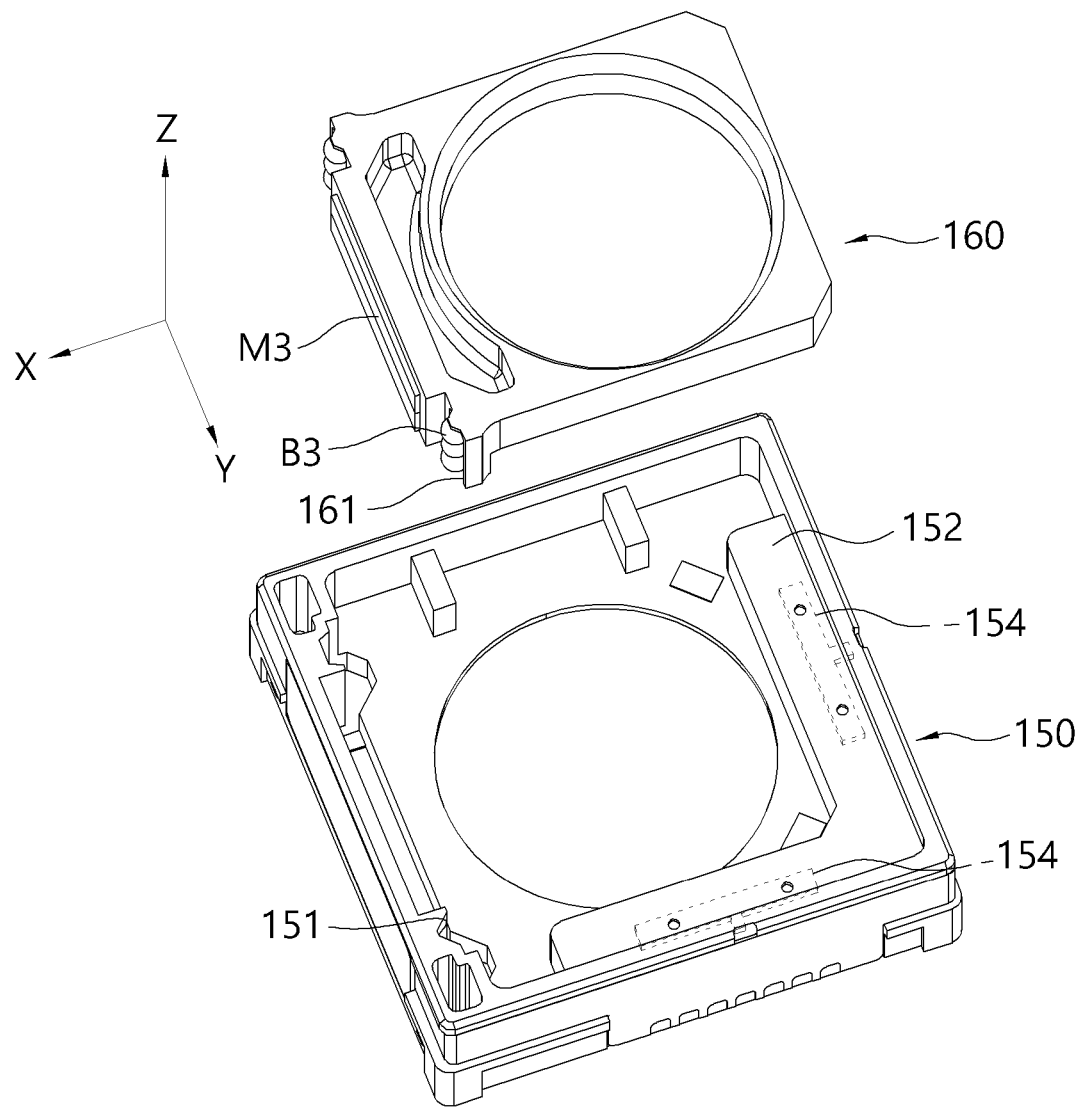
FIG. 8 is an exploded coupled view of the support frame and an AF carrier according to the embodiment of the present invention.
Figure 9:
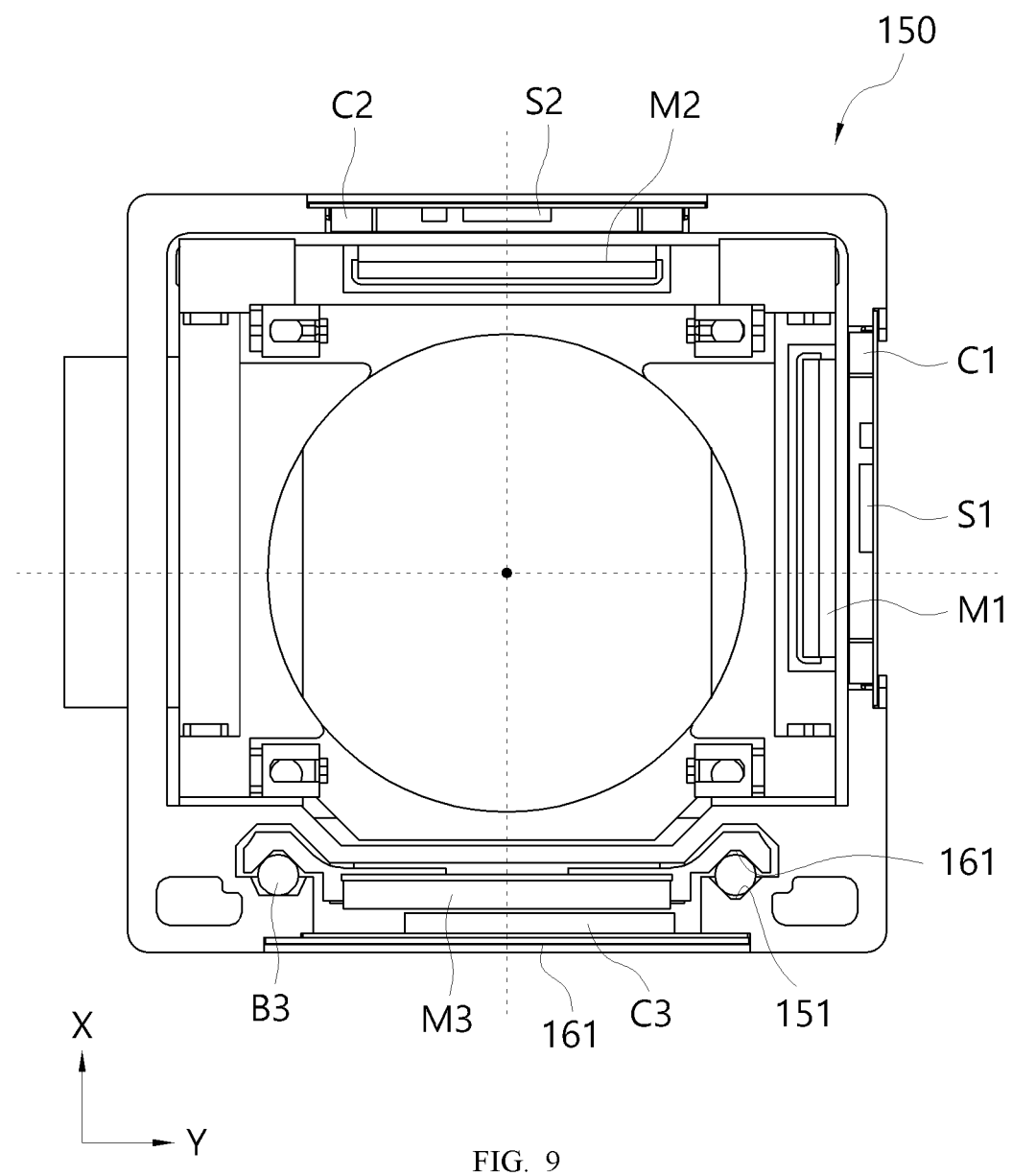
FIG. 9 is a coupled top plan view of the support frame and the AF carrier according to the embodiment of the present invention.

FIG. 8 is an exploded coupled view of the support frame and the AF carrier according to the embodiment of the present invention, and FIG. 9 is a coupled top plan view of the support frame and the AF carrier according to the embodiment of the present invention.

Hereinafter, the implementation of the AF function of the actuator according to the embodiment of the present invention will be described with reference to FIGS. 8 and 9.

The actuator 100 according to the embodiment of the present invention includes fifth guide rails 161 provided on an outer portion of the AF carrier 160 and disposed in the optical axis direction (Z-axis direction), sixth guide rails 151 provided on an inner portion of the support frame 150 and disposed to face the fifth guide rails 161, and AF balls B3 provided between the fifth and sixth guide rails 161 and 151.

The AF balls B3 may roll between the fifth and sixth guide rails 161 and 151 and move the AF carrier 160 in the optical axis direction.

The fifth guide rails 131 may be formed at two opposite sides of an outer surface of the AF carrier 160 where the first to fourth guide rails 131, 141, 142, and 153 are not provided.

The third magnet M3 may be provided between the fifth guide rails 131. The third drive coil C3 may be disposed on the inner surface of the support frame 150 and face the third magnet M3, and the third Hall sensor S3 may be disposed outside the third drive coil C3.

The support frame 150 may provide a movement space for the AF carrier 160. Further, the AF carrier 160 is provided in the support frame 150 and moves in the optical axis direction (Z-axis direction) based on the support frame 150. Therefore, when the AF carrier 160 is a movable body, the support frame 150 corresponds to a stationary body from a corresponding standpoint.

When electric power, which has an appropriate magnitude and direction, is applied to the third drive coil C3, the third drive coil C3 generates an electromagnetic force on the third magnet M3 installed on the AF carrier 160, and the AF carrier 160 is moved in the optical axis direction by the electromagnetic force.

Because the lens assembly is mounted on the AF carrier 160, the lens assembly also moves in the optical axis direction when the AF carrier 130 moves in the optical axis direction, such that a focal length with respect to the image sensor 120 is adjusted.

The AF carrier 160 may be moved by feedback control between the third Hall sensor S3 and the operation driver.

Meanwhile, the third Hall sensor S3 may be affected by the magnetic field fields formed by the first and second magnets M1 and M2. In particular, because the second magnet M2 is distant from the third Hall sensor S3, the second magnet M2 is not greatly affected. However, because the first magnet M1 is disposed to be comparatively close to a fourth Hall sensor S3, the third Hall sensor S3 may be affected in accordance with a movement of the first magnet M1.

To prevent this situation, as illustrated in FIG. 6, the third Hall sensor S3 may be disposed outside the third drive coil C3 and disposed at a position most spaced apart from the first and second magnets M1 and M2.

In addition, as illustrated in FIG. 9, because the first magnet M1 is disposed to be closer to the second magnet M2 based on a center thereof, it is possible to minimize a degree to which the third Hall sensor S3 is affected by the first magnet M1.

The movement of the first OIS carrier 130 in the first direction, the movement of the second OIS carrier 140 in the second direction, and the movement of the AF carrier 160 in the optical axis direction are independently performed by separate processes and separate physical structures. Therefore, the movements in the respective directions may be independently performed. Alternatively, the movements in the plurality of combinations of the directions (XY, XZ, YZ, XYZ, and the like) may, of course, be simultaneously performed.

According to the actuator 100 according to the embodiment of the present invention described above, the first to third magnets M1, M2, and M3 and the first to third drive coils C1, C2, and C3 are disposed uprightly in the optical axis direction, such that a thickness (based on the optical axis direction) of the actuator 100 may be significantly reduced.

Recently, a width of a main substrate has been sufficiently increased in accordance with an increase in width of a screen display means of a portable terminal. Because the actuator 100 of the present invention increases in size only in a width direction, which is a horizontal direction based on the optical axis, it is possible to implement a structure that more properly conforms to the trend of the portable terminal.

Figure 10:
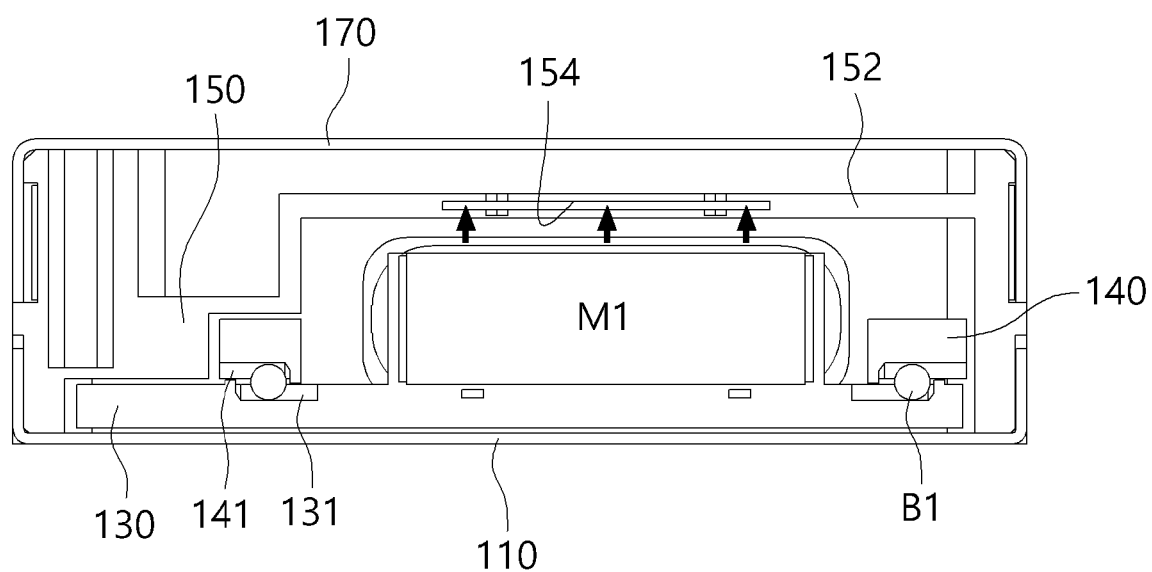
FIG. 10 is a view for explaining a function of an attraction yoke provided on the support frame according to the embodiment of the present invention.

FIG. 10 is a view for explaining a function of an attraction yoke provided on the support frame according to the embodiment of the present invention.

As illustrated in FIG. 10, the support frame 150 may have attraction yokes 154 disposed to respectively face upper portions of the first and second magnets M1 and M2 (based on the optical axis direction) and configured to pull the first OIS carrier 130 toward the support frame 150.

In this case, the attraction yokes 154 may be provided on an upper portion of the receptacle 152 of the support frame 150 and respectively face the upper portions of the first and second magnets M1 and M2 (based on the optical axis direction). Further, the attraction yoke 154 may be made of a metallic material having magnetism and generate attractive forces together with the first and second magnets M1 and M2.

Therefore, the attraction yokes 154 may pull the first OIS carrier 130 toward the support frame 150 by means of the attractive force between the first and second magnets M1 and M2. Therefore, it is possible to prevent the first OIS ball B1 from being separated to the outside. Further, the attraction yokes 154 may move the first OIS carrier 130 away from a bottom surface of the base 110 at a predetermined distance, thereby preventing interference with the base 110 when the first OIS carrier 130 moves.

Meanwhile, with reference to FIG. 4, the first OIS balls B1 may be disposed on the same line as the first and second magnets M1 and M2 to maximally use the attractive forces between the attraction yoke 154 and the first and second magnets M1 and M2.

The present invention has been described with reference to the limited embodiments and the drawings, but the present invention is not limited thereto. The described embodiments may be changed or modified by those skilled in the art to which the present invention pertains within the technical spirit of the present invention and within the scope equivalent to the appended claims.

In the above-mentioned description of the present invention, the modifies such as first and second are only instrumentally conceptual terms used to distinguish relatively constituent elements from one another and should not be construed as terms used to indicate any particular order, priority, or the like.

The description of the present invention and the accompanying drawings attached for the purpose of illustrating the embodiments may be somewhat exaggerated to emphasize or highlight the technical contents according to the present invention technology. However, it should be interpreted that various modified applications may be made at the level of those skilled in the art in consideration of the contents disclosed and illustrated in the description and drawings.

INDUSTRIAL APPLICABILITY

The camera actuator according to the present invention may be applied to stand-alone camera devices as well as camera modules and the like mounted in mobile terminals such as mobile phones and smartphones.

What is claimed is:

1. A camera actuator comprising:
   a first optical image stabilization (OIS) carrier having a first magnet, a second magnet and an image sensor and configured to move in a first direction perpendicular to an optical axis direction;
   a first drive coil configured to generate an electromagnetic force on the first magnet to move the first OIS carrier in the first direction;
   a second OIS carrier provided on an upper portion of the first OIS carrier and configured to move in a second direction perpendicular to the optical axis direction and the first direction;
   a second drive coil configured to generate an electromagnetic force on the second magnet to move the second OIS carrier in the second direction; and
   a support frame having the first drive coil and the second drive coil and configured to provide a movement space for the first OIS carrier and the second OIS carrier.

2. The camera actuator of claim 1, further comprising:
   a first guide rail provided on the upper portion of the first OIS carrier and disposed in the first direction;
   a second guide rail provided on a lower portion of the second OIS carrier and disposed to face the first guide rail; and
   a first OIS ball provided between the first guide rail and the second guide rail.

3. The camera actuator of claim 2, further comprising:
   a third guide rail provided on an upper portion of the second OIS carrier and disposed in the second direction;
   a fourth guide rail provided on a lower portion of the support frame and disposed to face the third guide rail; and
   a second OIS ball provided between the third guide rail and the fourth guide rail.

4. The camera actuator of claim 1, wherein the support frame has attraction yokes disposed to respectively face the first magnet and the second magnet and configured to pull the first OIS carrier toward the support frame.

5. The camera actuator of claim 4, wherein the support frame has a receptacle configured to accommodate the first magnet and the second magnet.

6. The camera actuator of claim 5, wherein each of the attraction yokes is provided on an upper portion of the receptacle.

7. The camera actuator of claim 1, further comprising:
   an autofocus (AF) carrier having a third magnet and a lens assembly and configured to move in the optical axis direction; and
   a third drive coil provided on the support frame and configured to generate an electromagnetic force on the third magnet to move the AF carrier in the optical axis direction.

8. The camera actuator of claim 7, further comprising:
   a fifth guide rail provided on an outer portion of the AF carrier and disposed in the optical axis direction;
   a sixth guide rail provided on an inner portion of the support frame and disposed to face the fifth guide rail; and
   an AF ball provided between the fifth guide rail and the sixth guide rail.

9. The camera actuator of claim 7, further comprising:
   a first Hall sensor disposed inside the first drive coil;

a second Hall sensor disposed inside the second drive coil; and a third Hall sensor disposed outside the third drive coil and disposed at a position most spaced apart from the first magnet and the second magnet.

10. The camera actuator of claim 9, wherein the first magnet is disposed to be closer to the second magnet based on a center thereof.

\* \* \* \* \*